Figure 1:
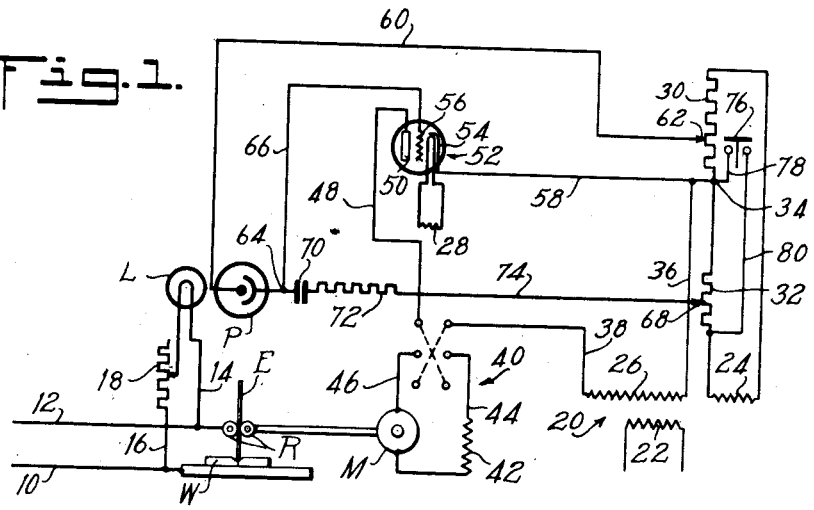

Nov. 26, 1940.                    L. T. JONES                    2,223,177

AUTOMATIC ELECTRIC WELDING

Filed Aug. 24, 1938

INVENTOR
LLOYD T. JONES
BY
E. Greenewald
ATTORNEY

Patented Nov. 26, 1940

2,223,177

UNITED STATES PATENT OFFICE 2,223,177

AUTOMATIC ELECTRIC WELDING

Lloyd T. Jones, Berkeley, Calif., assignor to The Linde Air Products Company, a corporation of Ohio Application August 24, 1938, Serial No. 226,413

8 Claims. (Cl. 219—8)

This invention relates to welding and more particularly to a highly sensitive control system for automatic electric welding apparatus.

In electrical welding operations of the type in which the welding current is passed between a pair of relatively movable electrodes, one of which may be the work to be welded and the other of which may be a rod or wire of metal to be added to the weld, it is desirable to maintain a constant distance between the electrodes. When this distance is maintained at a fixed value, the voltage drop between the electrodes remains substantially constant. Thus, the welding current remains substantially uniform and the resulting weld is uniform throughout its length.

In order to maintain a substantially constant separation of the electrodes, it is customary to utilize some characteristic of the welding voltage or current to control a means for moving one of the electrodes with respect to the other. The rate of movement of the movable electrode is thus coordinated with the rate of melting thereof so that the distance between the electrodes remains substantially constant. The means for moving the movable electrode usually includes driving rollers actuated by an electric motor, and it has been found convenient to make use of the variations in the voltage drop between the electrodes to control the rate of operation of the feeding motor.

In some instances, the variations in this voltage drop are directly impressed on the motor circuit, but usually an intermediate relay, responsive to variations in this voltage drop, is used to control the power circuit for the motor. The relay system has the disadvantage that a variation of one or more volts is necessary to actuate the relay, thus impairing the sensitivity of operation of the feeding means.

More sensitive feeding of the movable electrode has been attained by balancing the voltage drop between the electrodes against a constant voltage of approximately the same order as the desired welding voltage drop, and impressing the resultant voltage on the grid of a grid-controlled space discharge device, in the output circuit of which the feeding motor is connected. As the output of the space discharge device is sensitively controlled by the impressed grid voltage, the feeding motor is responsive to very slight variations in the voltage drop between the electrodes. Since the voltage differential in this system is a definite value, it is possible to increase the sensitivity of operation by balancing a multiple of the voltage drop against a suitably amplified constant voltage. The latter method is particularly applicable to welding with an alternating current, in which case, the multiple of the voltage drop between the electrodes may be obtained by electrical transformation.

While the above described control system is very satisfactory in operation, the necessary circuit connections therefor are considerably complicated and the system requires a large number of component elements. Naturally, the complications of construction and the cost of the many component parts tend to mitigate the operating advantages.

It is therefore among the objects of this invention to provide an automatic electric welding control system which, while very sensitive to changes in the welding voltage, is simple in arrangement, comprises relatively few component elements, is accurate in operation and is easily adjustable; and which system sensitively and accurately coordinates the rate of feeding of the movable electrode and the rate of consumption thereof to maintain the distance between the electrodes at a substantially constant value.

Figure 2:
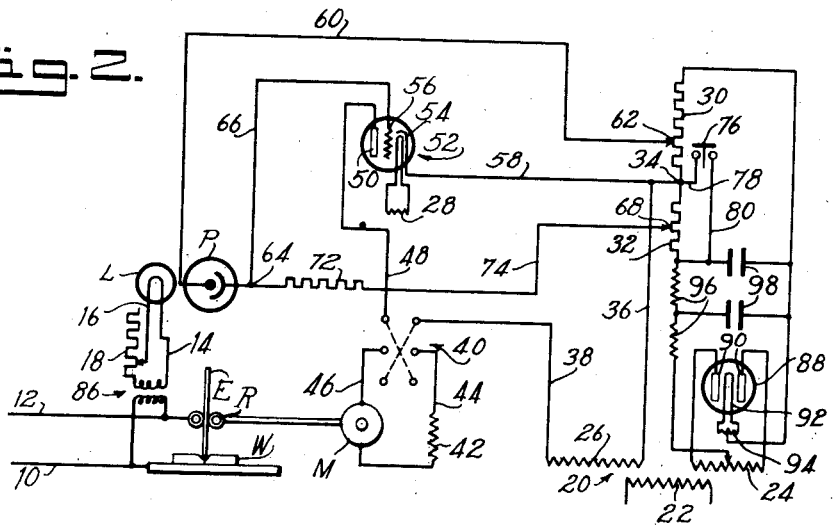

These and other objects of the invention will in part be obvious and in part become apparent from the following description and the accompanying drawing, in which:

Fig. 1 diagrammatically illustrates one embodiment of the invention;

Fig. 2 diagrammatically illustrates another embodiment of the invention; and

Figure 3:
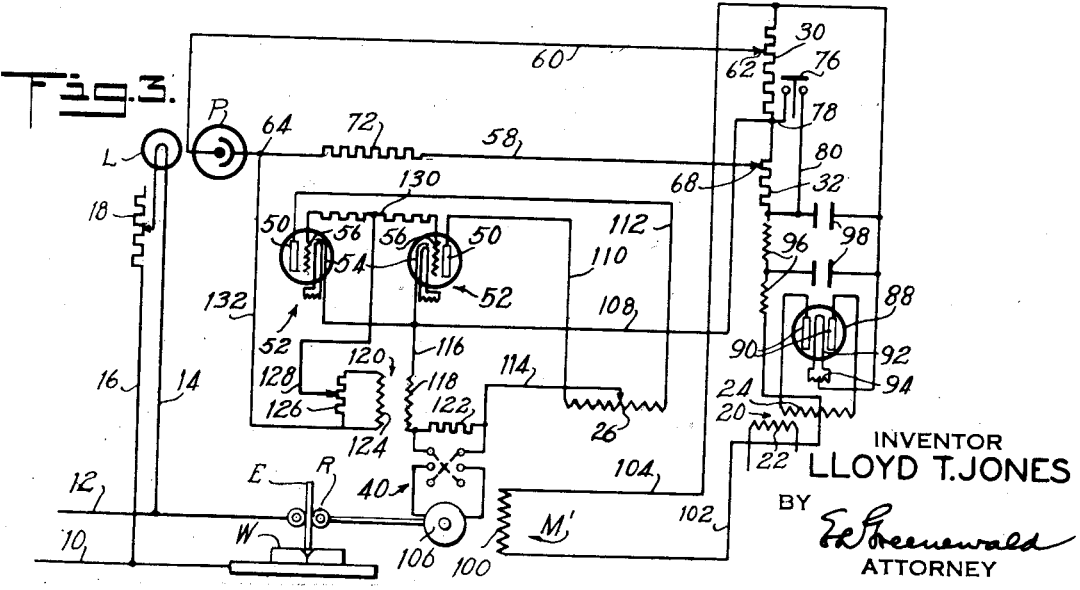

Fig. 3 diagrammatically illustrates a further embodiment of the invention.

Generally speaking, the objects of the invention are attained by providing a control circuit electrically independent of the main or welding circuit and non-electrically coupling the welding and control circuits by means of a highly sensitive to variations in the voltage drop between the electrodes. Preferably, this highly sensitive coupling, which may comprise a radiant energy emitting means, such as an incandescent lamp, connected in the main or welding circuit and a variable resistance element, such as a photoelectric cell or other radiant energy responsive means connected in the control circuit, varies the voltage impressed upon the control element of a space discharge device to correspondingly control the flow of current to an electric feeding means for the movable electrode. The control circuit includes means for impressing a substantially constant voltage on the aforesaid control element and means, including the circuit coupling means, for impressing on said control element in opposition to the substantially constant voltage impressed thereon, a voltage which varies in proportion to the variations in the voltage drop between the electrodes.

By non-electrically coupling the welding and control circuits, the control system is applicable equally to either direct current or alternating current welding systems.

Referring specifically to the embodiment of the invention illustrated in Fig. 1, the welding circuit includes a pair of conductors 10, 12, connected at one end to the work to be welded W and the welding electrode E, respectively, and at the other end to a suitable source of electrical energy, such as a welding generator or transformer. The movable member, or electrode, E is adapted to be moved relatively to the fixed member, or work W, by a pair of rollers R operatively engaging electrode E and actuated by an electric motor M. For a purpose to be described hereinafter, an incandescent lamp L is connected to the welding circuit in parallel with the electrode E and the work W by means of conductors 14 and 16, and the "threshold" value of illumination of lamp L may be adjusted by means of a variable resistor 18 inserted in the conductor 16.

Electrical energy is supplied to the control circuit by means of a transformer 20 having a primary winding 22 and a plurality of secondary windings 24, 26, and 28. The secondary winding 24 is connected in series with a relatively large variable resistor 30 and relatively small variable resistor 32, which are interconnected at a midpoint 34. Winding 26 supplies power to operate the motor M, and is connected by a conductor 36 to point 34 and by a conductor 38 to one terminal of a standard reversing switch 40. Switch 40 is connected to the field 42 of the series motor M by a conductor 44 and to the armature of the motor by a conductor 46. Another conductor 48 connects a terminal of switch 40 to the anode or plate 50 of a space discharge device or rectifier 52, which may be of the grid-controlled, mercury vapor type having an indirectly heated cathode or filament 54 and a grid 56. The heating element of the cathode or filament 54 is supplied with current by the secondary winding 28 of transformer 20, and the filament proper is connected to point 34 by a conductor 58.

From the above description, it will be apparent that the motor M is supplied with operating current from the winding 26 through the output circuit of the discharge device 52. The device 52 acts as a half-wave rectifier for the alternating current delivered by the winding 26. It is therefore necessary that the voltage impressed by the winding 26 on the device 52 be approximately twice the rated operating voltage of the motor in order that the latter will be capable of delivering its rated power from current impulses extending over a half cycle only. For instance, in the case of a ⅓ horsepower motor having a rated voltage of 110 volts, the rated voltage of winding 26 must be approximately 250 volts.

In the type of space discharge device described, the current delivered through the output circuit is controlled by the relative potential impressed between the grid 56 and the cathode 54. This invention is directed particularly to a novel means for sensitively varying this impressed voltage in accurate accordance with variations in the voltage drop between the members E and W, which means will be now particularly described.

Arranged in operative relation to the lamp L is a photoelectric cell P, the positive element of which is connected by a conductor 60 to a point 62 on the large resistor 30. The negative element of the photoelectric cell P is connected to a junction point 64, to which point the grid 56 of device 52 is connected by a conductor 66. Junction point 64 is connected to a point 68 on the small resistor 32 through a capacity 70, a large resistor 72, and a conductor 74. The control circuit may be shunted, for the purpose of initially positioning the electrode E, by a switch 76 connected in parallel with the small resistor 32 by conductors 78 and 80.

For an understanding of the operation of the invention, assume that the instantaneous direction of the electromotive force in the winding 24 is such as to make the left hand terminal of the winding negative and the right hand terminal positive. Then the point 62 on resistor 30 will be relatively positive with respect to midpoint 34 and the point 68 on resistor 32 relatively negative with respect to midpoint 34. The midpoint 34 is connected to both the filament 54 and the right hand terminal of winding 26, which under the assumed conditions is relatively negative with respect to the left hand terminal of this winding. The point 62 is so chosen that, when photoelectric cell P is energized, the positive potential applied to junction point 64 (and thus to grid 56) by resistor 30 will overbalance the relatively negative potential applied to junction point 64 by resistor 32 through resistor 72 and capacity 70. In a specific instance, the values of resistors 30, 32, and 72 may be, respectively, 2000 ohms, 500 ohms, and 10,000 ohms. Capacity 70 may have a value ranging from about 0.0008 microfarad to about 0.1 microfarad.

The variable resistor 18 in the circuit of lamp L is now adjusted so that the lamp will have a "threshold" value of illumination corresponding to the desired welding voltage. The opposing voltages impressed on the grid 56 are so arranged that the feeding motor M is held inoperative until the illumination of lamp L, which varies as the 6th power of the welding voltage, exceeds this "threshold" value. When the illumination increases beyond this value, due to consumption of electrode E causing an increase in the distance between the electrode and the work and a corresponding increase in the voltage drop therebetween, the photoelectric cell will be sufficiently energized to cause the grid 56 to become less negative and permit the device 52 to supply current. Current will then flow in the output circuit of device 52 to energize motor M in a direction to move electrode E toward the work W. This movement continues until the proper spacing between the electrode and the work is attained, thus reducing the welding voltage drop to normal. When the voltage is normal, the illumination of lamp L is at the "threshold" value, and, due to the resistance of the photoelectric cell P, the grid 56 becomes "biased" at its normal value which prevents reestablishment of the current through the device 52, and therefore no current will flow through the motor circuit.

As, in accordance with the well known laws of electrical and radiation phenomena, the illumination of lamp L varies approximately as the 6th power of the welding voltage drop, it will be apparent that variations in the welding voltage are, in effect, greatly amplified and the sensitivity of operation of the control circuit thus greatly increased.

In the arrangement shown in Fig. 2, direct current is used to bias the grid 56 of device 52 and to operate the photoelectric cell P. As the circuit is generally similar to that shown in Fig. 1, like reference characters have been used to denote like parts.

In this circuit, current to operate lamp L is supplied through a transformer 86. It will be obvious that the lamp L, in any instance, may be energized either directly or through a transformer if the welding circuit uses alternating current. Also, as the grid biasing circuit is supplied with direct current, the capacity 70 is no longer necessary for reasons well known to those skilled in the electrical arts.

Direct current for the biasing circuits of the grid 56 of device 52 and the photoelectric cell P is supplied by a full wave rectifying tube 88, the anodes 90 of which are connected respectively to either terminal of winding 24. The cathode, or filament, 92 of tube 88 is energized by an additional secondary winding 94 on the transformer 20. One terminal of the circuit including the resistors 30 and 32 is connected to the midpoint of winding 24 and the other terminal thereof is connected to the midpoint of winding 94. A standard filter circuit including inductances 96 and capacitors 98 is connected in the output circuit of tube 88 to stabilize the circuit.

As the operation of this circuit is identical with the circuit shown in Fig. 1, a detailed explanation thereof is believed unnecessary.

Fig. 3 shows a circuit by which a larger motor, separately excited, can be driven at full power by full wave rectified current supplied by two space discharge devices of the grid-controlled mercury-vapor type. As certain portions of this circuit, particularly that for supplying direct current to operate the photoelectric cell P and to the grid biasing circuit, are the same as those of Fig. 2, like reference characters have been used to designate like parts.

The field 100 of the motor M' is supplied with direct current from the tube 88 through a pair of conductors 102, 104, one of which is connected to the midpoint of winding 24 and the other of which is connected to the midpoint of winding 94. It will be noted that, due to the smoothing characteristics of the field winding, the field supply does not need to be passed through the filter circuit.

Full wave rectified current for the armature 106 of the motor M' is supplied by a pair of space discharge devices 52, the filaments 54 of which are commonly connected by a conductor 108 to the midpoint 34 between resistors 30 and 32. The plates or anodes 50 of the devices 52 are respectively connected by conductors 110 and 112 to either end of winding 26, the midpoint of which winding is connected by a conductor 114 to one terminal of reversing switch 40. The filaments 54 are connected through a conductor 116 and the primary winding 118 of a transformer 120 to the opposite terminal of switch 40. A motor braking resistance 122 is connected across these two terminals of switch 40 and the motor armature 106 is connected to the central pair of terminals of the switch. The motor braking resistance prevents undue overrunning of the motor when the power supply of the motor is interrupted by the control system.

Connected in parallel with the secondary winding 124 of transformer 120 is a resistor 126, the adjustable contact of which is connected by a conductor 128 to the midpoint of a grid leak 130 connected at each end to one of the grids 56 of the devices 52. One common terminal of winding 124 and resistor 126 is connected by a conductor 132 to the junction point 64.

The transformer 120, having its primary winding 118 connected in the motor circuit and its secondary winding 124 connected in the grid circuit of devices 52, acts to stabilize the operation of devices 52 and the feed motor M'. Thus, when the counter-electromotive force of the motor M' increases during welding, or voltage surges are produced through the inductive effect of the motor armature 106, any tendency of the discharge devices 52 to pass out of the critical voltage range and operate prematurely is offset by the compensatory effect produced by the transformer 120, which opposes the inductive effect of the motor armature 106 and prevents the inductive effect being carried over into a succeeding half cycle. Under certain conditions of operation, this feature of the control system shown in Fig. 3 is not essential, and the necessary stability of operation can be obtained through the dissipation of excess energy in the resistance 122.

The operation of the above described control system is the same as those of the systems previously described. When the "threshold" value of illumination of lamp L is exceeded, as by an increase in the welding voltage drop, the photoelectric cell P is sufficiently energized so that the potential applied to the grids through the photoelectric cell circuit overcomes that supplied through the resistor 72 to remove the grid bias and permit current flow to the motor armature through the output circuit of devices 52.

It will be apparent that in any of the above described systems, the control of the feeding motor is entirely independent of the type of current in the main or welding circuit, as the illumination of lamp L changes approximately as the 6th power of the voltage drop irrespective of whether its energizing current is direct or alternating. Furthermore, as previously explained, in case the current is alternating, the lamp L may be energized, if desired, through the medium of a transformer.

The combination of the exponential relation of illumination to applied voltage of the lamp L and the extreme sensitivity of the photoelectric cell P, results in a highly accurate, extremely sensitive control of the feeding of the movable member or electrode.

In any of the above systems, the shunting switch 76 may be closed to remove the grid bias and thus energize the feeding motor to properly position the electrode with respect to the work in advance of the start of the welding operation.

While, for purposes of illustration, the non-electric coupling between the main and control circuits has been shown as comprising an incandescent lamp and a photoelectric cell, it will be obvious that other sensitive non-electric couplings, including pyrometers, thermocouples, etc., may be used, and the invention is not to be limited to the specific embodiments shown but may be otherwise embodied within the limitations imposed by the following claims.

What is claimed is:

1. An automatic electric control system comprising, in combination, a main circuit including a movable member and a fixed member; electrically operable means for feeding said movable member toward said fixed member; a grid controlled space discharge device controlling the flow of current to said feeding means; a first circuit for impressing on the grid of said device a substantially constant potential; a second circuit for impressing on said grid a potential in opposition to said substantially constant potential; a variable resistance element in said second circuit; and means electrically connected only to said main circuit for varying the resistance of said element in accordance with fluctuations in the voltage of said main circuit to vary the differential value of the opposing potentials applied to said grid.

2. An automatic electric control system as claimed in claim 1, in which said last-named means comprises a radiant energy emitting means and said variable resistance element comprises a radiant energy responsive means.

3. An automatic electric control system as claimed in claim 1, in which said last-named means comprises an incandescent lamp and said variable resistance element comprises a photoelectric cell.

4. An automatic electric control system comprising, in combination, a main circuit including a movable member and a fixed member; electrically operable means for feeding said movable member toward said fixed member; a grid-controlled rectifier for supplying current to said feeding means; a first circuit for impressing a constant potential on said grid; a second circuit for impressing a variable opposing potential on said grid; an incandescent lamp connected in said main circuit in parallel with said movable member and said fixed member; and a photoelectric cell connected in said second circuit and arranged in operative relation to said incandescent lamp.

5. An automatic electric control system comprising, in combination, a main circuit including a movable member and a fixed member; an incandescent lamp connected in parallel with said movable member and said fixed member; electrically operable means for feeding said movable member toward said fixed member; a circuit for said feeding means; a space discharge device including an anode and a cathode connected in said circuit for said feeding means and a grid; an alternating current circuit comprising a transformer winding and a pair of resistances connected in series; a conductor connecting the common junction of said resistors to said cathode; a photoelectric cell operatively associated with said lamp; a circuit, including said conductor and at least a portion of one of said resistances, for impressing on said grid a substantially constant potential; and a circuit, including said conductor, said cell, and at least a portion of the other of said resistances, for impressing on said grid a varying potential in opposition to said substantially constant potential, whereby the rate of operation of said electrically operable means will be varied in accordance with fluctuations in the voltage of said main circuit.

6. An automatic electric control system comprising, in combination, a main circuit including a movable member and a fixed member; an incandescent lamp connected across said main circuit; electrically operable means for feeding said movable member toward said fixed member; a supply circuit for said feeding means; a grid controlled rectifier in said supply circuit; a transformer; a full wave rectifier connected across the terminals of said transformer; a filter circuit connected to said full wave rectifier; two resistances connected in series with said full wave rectifier; a photoelectric cell operatively associated with said incandescent lamp; a conductor connecting the common junction of said resistances to the cathode of said grid-controlled rectifier; means, including said conductor and at least a portion of one of said resistances, for impressing on said grid a substantially constant potential; and means including said conductor, said cell, and at least a portion of the other of said resistances, for impressing on said grid a varying potential in opposition to said substantially constant potential, whereby the rate of operation of said electrically operable means will be varied in accordance with fluctuations in the voltage of said main circuit.

7. An automatic electric control system comprising, in combination, a main circuit including a pair of relatively movable members; an incandescent lamp connected across said main circuit; an electric motor for feeding said members toward each other; a pair of grid-controlled space discharge devices; a first transformer for supplying alternating current to the input circuit of said space discharge devices; an output circuit for said space discharge devices including the armature of said motor and the primary winding of a second transformer; means, including the secondary winding of said second transformer, for applying a portion of the output potential of said devices to the grids thereof; means for separately exciting the field of said motor including a secondary winding of said first transformer and a full wave rectifier; and a control circuit for said motor, said circuit including a source of constant potential connected to the grids of said devices and means for supplying a variable potential to said grids in opposition to said constant potential, said means comprising a photoelectric cell operatively associated with said incandescent lamp.

8. An automatic electric control system comprising, in combination, a main circuit including a pair of relatively movable members; electrically operable means for moving one of said members toward the other thereof; a radiant energy emitting device associated with said main circuit; a control circuit for said electrically operable means; a pair of grid-controlled space discharge devices in said control circuit; means for connecting the output circuit of said devices to said electrically operable means; means for impressing a portion of the output voltage of said devices on the grid circuit thereof; means for impressing a substantially constant voltage on the grids of said devices; and radiant energy responsive means in said control circuit and operatively associated with said radiant energy emitting means for impressing on said grids a varying voltage in opposition to said substantially constant voltage to vary the bias on said grids in response to changes in the voltage drop between said members.

LLOYD T. JONES.

CERTIFICATE OF CORRECTION.

Patent No. 2,223,177. November 26, 1940.

LLOYD T. JONES.

It is hereby certified that error appears in the printed specification of the above numbered patent requiring correction as follows: Page 4, second column, line 13, claim 6, strike out the syllable and words "tential; and means including said conductor, said"; and that the said Letters Patent should be read with this correction therein that the same may conform to the record of the case in the Patent Office.

Signed and sealed this 24th day of December, A. D. 1940.

(Seal)

Henry Van Arsdale,
Acting Commissioner of Patents.